United States Patent
Hecht et al.

[11] Patent Number: 5,292,691
[45] Date of Patent: Mar. 8, 1994

[54] MOLYBDENUM DISILICIDE MATRIX COMPOSITES REINFORCED WITH CONTINUOUS CERAMIC FIBERS

[75] Inventors: Ralph J. Hecht, North Palm Beach; Michael J. Maloney, Port St. Lucie, both of Fla.

[73] Assignee: United Technologies Corporation, Hartford, Conn.

[21] Appl. No.: 819,720

[22] Filed: Jan. 13, 1992

[51] Int. Cl.$^5$ ............................................. C04B 35/58
[52] U.S. Cl. ........................................ 501/96; 501/89; 501/92; 501/95
[58] Field of Search .................... 501/89, 92, 95, 96

[56] References Cited

U.S. PATENT DOCUMENTS

| | | | |
|---|---|---|---|
| 3,246,950 | 4/1966 | Gruber | 423/346 |
| 3,364,975 | 1/1968 | Gruber | 164/55.1 |
| 3,386,840 | 6/1968 | Gruber | 501/88 |
| 3,653,851 | 4/1972 | Gruber | 428/539.1 |
| 3,772,042 | 11/1973 | Stringer et al. | 501/92 |
| 4,016,313 | 4/1977 | Schrewelius | 501/92 X |
| 4,923,829 | 5/1990 | Yasutomi et al. | 501/95 |
| 4,927,792 | 5/1990 | Petrovic et al. | 301/92 |
| 4,935,118 | 6/1990 | Agarwal et al. | 304/421 |
| 4,970,179 | 11/1990 | Petrovic et al. | 501/92 |
| 5,000,896 | 3/1991 | Petrovic et al. | 501/92 X |
| 5,045,237 | 9/1991 | Washburn | 501/92 X |
| 5,069,841 | 12/1991 | Petrovic et al. | 501/92 X |

*Primary Examiner*—Donald P. Walsh
*Assistant Examiner*—Ngoclan T. Mai
*Attorney, Agent, or Firm*—Herbert W. Mylius

[57] ABSTRACT

A molybdenum disilicide composite comprising ceramic reinforcing fibers and sufficient particulate silicon carbide, silicon nitride, boron nitride or silica to modify the coefficient of thermal expansion of the matrix to match that of the fiber is found to have improved high temperature strength, creep resistance, toughness, and resistance to matrix cracking during thermal cycling.

14 Claims, No Drawings

MOLYBDENUM DISILICIDE MATRIX COMPOSITES REINFORCED WITH CONTINUOUS CERAMIC FIBERS

The invention was made under a U.S. Government contract and the Government has rights herein.

BACKGROUND OF THE INVENTION

1. Field of the Invention

This invention relates to reinforced intermetallic matrix composites, and particularly to ceramic fiber reinforced molybdenum disilicide matrices having improved high temperature strength, creep resistance, and toughness.

2. Description of the Prior Art

Molybdenum disilicide is an intermetallic compound with a melting temperature in excess of 2000° C., excellent high temperature oxidation resistance, and high thermal conductivity. Several problems, however, limit the use of molybdenum disilicide as a high temperature material, such as insufficient high temperature strength, creep resistance, and toughness. Accordingly, fiber reinforcement of molybdenum disilicide has been attempted, using high strength continuous ceramic fibers such as aluminum oxide, and silicon carbide. During thermal cycling, however, ceramic fiber reinforced molybdenum disilicide matrices experience cracking caused by thermal stresses resulting from differences of coefficients of thermal expansion of the matrix and the reinforcing fiber. As disclosed herein, applicants have now formulated a ceramic fiber reinforced molybdenum disilicide composite capable of withstanding such thermal stresses, due to the presence of a particulate material which modifies the coefficient of thermal expansion of the matrix.

Attempts have been made previously to improve the high temperature capability of molybdenum disilicide matrix materials, such as by addition of silicon carbide whiskers. For example, Petrovic et al, in U.S. Pat. No. 4,927,792, disclose a molybdenum disilicide matrix composite which is reinforced with SiC whiskers throughout the matrix, to improve strength at high temperatures. The patentees' approach to overcoming matrix cracking during thermal cycling is to have the fibers in tension, and the surrounding matrix under compression, thus requiring a relatively high density of uniformly spaced fibers. Petrovic et al do not, however, suggest the inclusion of particulates to reduce the differences between the coefficient of thermal expansion of the MoSi$_2$ matrix and the reinforcing fibers.

Petrovic et al, in U.S. Pat. No. 4,970,179, disclose a modified MoSi$_2$ alloy matrix composite wherein the matrix contains from about 10 to about 30 percent SiC in the form of whiskers or submicron powder. In order to achieve increased strength at high temperatures, a portion of the MoSi$_2$ in the matrix is replaced with one or more refractory metal silicides, selected from tungsten disilicide, niobium disilicide, tantalum disilicide, molybdenum trisilicide, tungsten trisilicide, etc. Petrovic et al do not, however, suggest the inclusion of particulates to reduce the differences between the coefficient of thermal expansion of the MoSi$_2$ matrix and reinforcing fibers, and in fact do not suggest the inclusion of continuous ceramic reinforcing fibers to strengthen the matrix.

Washburn, in U.S. Pat. No. 5,045,237, discloses a refractory electrical device for use as a heating element, ignitor, and heat sensor, which contains fine powders of molybdenum disilicide, silicon carbide, and aluminum nitride which are sintered or hot pressed into rigid structures. The patent does not teach, however, the use of ceramic reinforcing fibers.

Agarwal et al, in U.S. Pat. No. 4,935,118, disclose a self-heated oxygen sensor package having a heating element comprising silicon carbide, silicon nitride, or molybdenum disilicide, or mixtures thereof. The reference teaches the addition of silicon nitride to avoid false readings of oxygen content, but makes no disclosure of modifying thermal expansion coefficients or adding ceramic reinforcing fibers.

Schrewelius, in U.S. Pat. No. 4,016,313, discloses a heat resistant material for use in kilns, and attempts to overcome decreased strength due to oxidation by filling the pores of the silicon carbide matrix material with an impregnate containing molybdenum disilicide and silicon. The reference, however, does not attempt to strengthen the matrix by the addition of ceramic fibers, or to modify the thermal expansion coefficient of the matrix.

In summary, while the prior art has disclosed the addition of particulate materials to molybdenum disilicide matrices to modify the high temperature properties thereof, and the use of reinforcing fibers in matrices, the references have not taught molybdenum disilicide matrices having modified coefficients of thermal expansion which thereby reduce stress between the matrices and continuous ceramic reinforcing fibers encompassed therein. Thus, the references have not overcome the problem of stress induced by thermal cycling of ceramic fiber reinforced molybdenum disilicide matrices.

SUMMARY OF THE INVENTION

The present invention comprises a molybdenum disilicide matrix capable of repeated thermal cycling, having improved high strength properties. It is an object of the present invention to provide a molybdenum disilicide matrix having its coefficient of thermal expansion altered to more closely match that of the ceramic fiber utilized as a reinforcing means.

It is also an object of the present invention to provide a high temperature intermetallic composite comprising a matrix of molybdenum disilicide, a particulate inclusion to modify the coefficient of thermal expansion of said matrix, and a continuous ceramic reinforcing fiber. It is a further purpose of this invention to provide a molybdenum disilicide matrix encompassing a thermal expansion coefficient modifying amount of a particulate material, and a ceramic reinforcing fiber.

Thus, the present invention comprises a composite having a molybdenum disilicide matrix having from about 5 to about 60 percent by volume of a particulate modifying agent selected from submicron powders, platelets, and whiskers of silicon carbide, silicon nitride, boron nitride, or silica, or mixtures thereof, the composite further comprising from about 5 to about 60 volume percent of a continuous reinforcing fiber selected from silicon carbide, silicon nitride, titanium diboride, and single crystal oxides such as aluminum oxide, mullite (3Al$_2$O$_3$-2SiO$_2$), zirconia, and YAG (3Y$_2$O$_3$-5Al$_2$O$_3$).

DESCRIPTION OF THE PREFERRED EMBODIMENTS

Molybdenum disilicide is a promising intermetallic compound for high temperature structural applications, particularly in oxidizing atmospheres. However, molybdenum disilicide by itself lacks sufficient high temperature strength, creep resistance, and toughness, and therefore requires reinforcement with high strength fibers such as alumina and silicon carbide. Such fiber reinforced molybdenum disilicide materials, however, are subject to microcracking induced by thermal expansion mismatch during thermal cycling.

It has now been discovered that this problem may be overcome by modifying the coefficient of thermal expansion of the molybdenum disilicide matrix to closely approximate that of the ceramic reinforcing fiber employed. This may be accomplished by the addition to the matrix of a suitable amount of particulate silicon carbide, silicon nitride, boron nitride, or silica.

The molybdenum disilicide matrix materials suitable for use in the present invention comprise the commercially available powders of essentially pure molybdenum disilicide or molybdenum disilicide containing other silicide alloying materials, such as tungsten disilicide, and/or rhenium disilicide or other small alloying additions. The matrix material should be utilized as a powder, having a particle size of from about 5 to about 14 microns, and preferably about 9 microns in diameter.

Commercially available ceramic fibers, selected from aluminum oxide, silicon carbide, titanium diboride, and single crystal oxides may be utilized to act as the matrix reinforcement. The preferred fibers are silicon carbide and aluminum oxide, particularly single crystal corundum, such as sapphire fiber. The fiber may be present in the final composite in an amount appropriate to achieve the desired strengthening, such as from about 5 to about 60 volume percent of the final composite, preferably from about 20 to about 40 volume percent, and most preferably from about 30 to about 40 volume percent.

Such fibers, having a diameter of, for example, about 125 microns, may be drawn through a binder-powder mixture to apply a coating of molybdenum disilicide and particulate modifying agent, in a bonding resin, to the surface of the fibers. The thus coated reinforcing fibers may then be assembled in layers, e.g. in the form of a tape, or in bundles, which may then be grouped as desired and subjected to appropriate fabrication techniques to remove the binder and form the desired composites. It is also appropriate, when utilizing ceramic reinforcing fibers, to apply a debonding layer to the surface thereof to provide a loose or weak interface between the fiber and the molybdenum disilicide matrix. Such debond layers may be applied by conventional techniques, such as chemical vapor deposition or sputtering, and include boron nitride and porous aluminum oxide, both of which are particularly suited for use on sapphire fibers.

It has been found that the coefficient of thermal expansion of molybdenum disilicide may be altered by the addition thereto of particulate silicon carbide, silicon nitride, boron nitride, or silica, or mixtures thereof. Such modifying material may be added to the molybdenum disilicide in the form of submicron powder, platelets having, for example, an aspect ratio of up to about 50:1, or whiskers having, for example, an aspect ratio of up to about 100:1. The amount of particulate to be utilized will be dependent upon the coefficient of thermal expansion of the ceramic reinforcing fiber to be employed, the amount of ceramic fiber to be present in the final composite, the diameter of said ceramic fiber, and the temperature ranges through which the desired composite is to be cycled. The specific proportion of particulate to be present in the matrix of the composite may be determined experimentally, or theoretically, to achieve the desired reduction in cracking. In general, however, the particulate may be present in amounts approximating from about 5 to about 20 volume percent of the matrix when the reinforcing fibers are alumina, and from about 15 to about 60 volume percent of the matrix when the reinforcing fibers are silicon carbide. The preferred amount of particulate may be from about 5 to about 15 volume percent in alumina reinforced matrices, and most preferably around 10 percent by volume particulate in such matrices. In silicon carbide reinforced matrices, the particulate preferably constitutes from about 20 to about 60 volume percent of the matrix, and most preferably from about 30 to about 60 volume percent. It is noted that silicon nitride has, from about 200° F. to about 2600° F., a lower coefficient of thermal expansion than silicon carbide, and may thus be anticipated to have a greater modifying effect upon the coefficient of thermal expansion of molybdenum disilicide than an equal amount of silicon carbide. It is possible to achieve very close approximations of the mean coefficient of thermal expansion of the reinforcing fiber over a given temperature range by mixing varying amounts and forms of silicon carbide, silicon nitride, boron nitride, and silica particulates in the matrix.

EXAMPLE 1

A silicon carbide fiber reinforced molybdenum disilicide matrix composite is prepared, formulated to provide 20 volume percent silicon carbide platelets and 20 volume percent silicon carbide powder in the matrix. Silicon carbide fiber, obtained from Textron Specialty Materials Corporation, as SCS-6 fiber, is coated with a binder-powder mixture containing $MoSi_2$ powder obtained from Herman Stark Co., and having an average particle size of about 9 microns, SiC platelet obtained from C-Axis Technologies, and SiC powder obtained from Lonza Corporation. The matrix and modifier particulates are suspended in a NeoCryl B-700 methacrylate polymer commercially available from ICI Resins, dissolved in a solvent comprising 70 volume percent heptane and 30 volume percent acetone, to which is added 2 weight percent ethylene glycol. The binder and the particulate materials are present in a ratio of 2:7, although this ratio could be varied to suit the amount of particulate matrix and modifier it is desired to impart to the fiber surface. Alternatively, a Rhoplex methyl methacrylate polymer binder, available from Rhom & Haas, or other suitable binders, could be used in place of the NeoCryl. After passage through the binder-powder material, the fiber is passed through a furnace at about 165° F. to fuse the binder resin, thus forming a silicon carbide fiber having a sheath of organic resin containing $MoSi_2$ and SiC particulates. This fiber is then wound about a drum adapted to receive a web of the fibers and the deposit of binder-powder, and formed into a tape. Sections of tape formed by this technique are then assembled into a stack and subjected to hot pressing at about 2550° F. for about 1.5 hours at about 4 Ksi pressure. The thus consolidated composite, with the resin burned out, is then subjected to hot isostatic pressing at about 2510° F. for about 1 hour at about 35 Ksi pressure, to form a fully consolidated composite. It is found upon testing of the composite that the addition of the particulate silicon carbide phase to the matrix results in a substantial reduction in matrix cracking when subjected to cycling between high and low temperatures.

EXAMPLE 2

A molybdenum disilicide matrix composite similar to that of Example 1 is prepared, utilizing an aluminum oxide reinforcing fiber, coated with a boron nitride debonding layer, and a mixture of 20 volume percent SiC platelets and 20 volume percent $Si_3N_4$ powder, based upon the matrix. It is shown that the addition of the silicon nitride particulate phase to the matrix is more effective in lowering the coefficient of thermal expansion of the matrix than the addition of only silicon carbide particulate, and a molybdenum disilicide matrix composite having improved elevated temperature characteristics is obtained.

It is to be understood that alternative methods for the preparation of the composites themselves are available, and that the above description of the present invention is susceptible to considerable modification, change, and adaptation by those skilled in the art, and that such modifications, changes, and adaptations, are to be considered within the scope of the present invention, which is set forth by the appended claims.

What is claimed is:

1. A reinforced molybdenum disilicide composite comprising molybdenum disilicide, from 5 to 60 volume percent continuous ceramic reinforcing fiber selected from the group consisting of silicon carbide and aluminum oxide, and a particulate modifying agent selected from the group consisting of silicon carbide, silicon nitride, boron nitride, silica, and mixtures thereof, said modifying agent comprising from about 15 to about 60 volume percent when said fiber is silicon carbide, and from about 5 to about 20 volume percent when said fiber is aluminum oxide.

2. The composite of claim 1, wherein said fiber is silicon carbide and comprises from about 20 to about 40 volume percent of said composite, and said particulate modifying agent comprises from about 20 to about 60 volume percent of said composite.

3. The composite of claim 2, wherein said particulate modifying agent comprises silicon carbide.

4. The composite of claim 3, wherein said silicon carbide fiber comprises from about 30 to about 40 volume percent of said composite, and said particulate modifying agent comprises from about 30 to about 60 volume percent of said composite.

5. The composite of claim 2, wherein said particulate modifying agent consists of a mixture of silicon carbide and silicon nitride.

6. The composite of claim 1, wherein said fiber is aluminum oxide and comprises from about 20 to about 40 volume percent.

7. The composite of claim 6, wherein said particulate modifying agent comprises silicon carbide.

8. The composite of claim 7, wherein said fiber comprises from about 30 to about 40 volume percent of said composite, and said particulate modifying agent comprises from about 5 to about 15 volume percent of said composite.

9. The composite of claim 8, wherein said particulate modifying agent comprises about 10 volume percent of said composite.

10. The composite of claim 6, wherein said particulate modifying agent consists of a mixture of silicon carbide and silicon nitride.

11. The composite of claim 10, wherein said fiber comprises from about 30 to about 40 volume percent of said composite, and said particulate modifying agent comprises from about 5 to about 15 volume percent of said composite.

12. The composite of claim 11, wherein said particulate modifying agent comprises about 10 volume percent of said composite.

13. A ceramic fiber reinforced molybdenum disilicide composite a molybdenum disilicide matrix and from about 30 to about 40 volume percent silicon carbide continuous reinforcing fiber, wherein the coefficient of thermal expansion of said molybdenum disilicide matrix is modified by the addition of from about 30 to about 60 volume percent particulate silicon carbide.

14. A ceramic fiber reinforced molybdenum disilicide composite comprising a molybdenum disilicide matrix and from about 30 to about 40 volume percent aluminum oxide continuous reinforcing fiber, wherein the coefficient of thermal expansion of said molybdenum disilicide matrix is modified by the addition of from about 5 to about 15 volume percent of a particulate modifying agent selected from the group consisting of silicon carbide, silicon nitride, and mixtures thereof.

* * * * *